United States Patent [19]

Tashiro

[11] Patent Number: 4,767,305

[45] Date of Patent: Aug. 30, 1988

[54] APPARATUS FOR SHAPING A SPHERICAL BODY

[75] Inventor: Yasunori Tashiro, Utsunomiya, Japan

[73] Assignee: Rheon Automatic Machinery Co., Ltd., Japan

[21] Appl. No.: 54,387

[22] Filed: May 26, 1987

[30] Foreign Application Priority Data

May 26, 1986 [JP] Japan .................................. 61-120493

[51] Int. Cl.$^4$ .............................................. A21C 11/10
[52] U.S. Cl. ........................................ 425/308; 99/537; 264/148; 264/157; 264/163; 426/503; 426/518
[58] Field of Search ............... 425/287, 288, 298, 313, 425/308–311, 315, 316, 466, 406; 264/145, 148, 149, 157, 163; 99/460, 461, 537; 72/254, 255; 426/512, 514, 516–518, 503

[56] References Cited

U.S. PATENT DOCUMENTS

| | | | |
|---|---|---|---|
| 1,932,345 | 10/1933 | Kremmling | 425/311 |
| 2,578,229 | 12/1951 | Clement et al. | 425/466 X |
| 3,332,369 | 7/1967 | Freed | 425/311 X |
| 3,901,641 | 8/1975 | Onder | 425/406 |
| 4,165,625 | 8/1979 | Wagner et al. | 72/254 X |
| 4,251,201 | 2/1981 | Krysiak | 425/311 X |
| 4,395,427 | 7/1983 | Fischer et al. | 264/148 X |
| 4,647,468 | 3/1987 | Pinto | 426/516 X |
| 4,676,727 | 6/1987 | Atwood | 425/315 X |

FOREIGN PATENT DOCUMENTS

| | | | |
|---|---|---|---|
| 219878 | 10/1958 | Australia | 72/254 |
| 60-85178 | 6/1985 | Japan | 425/308 |
| 2051644 | 1/1981 | United Kingdom | 72/254 |

Primary Examiner—Richard L. Chiesa
Attorney, Agent, or Firm—Guy W. Shoup; Paul J. Winters; Leighton K. Chong

[57] ABSTRACT

An apparatus for shaping a cylindrical body consisting of a dough crust and a filling into a spherical body consisting of a dough crust and a filling, comprising at least three slidable members adapted to slide on each other so as to constrict the cylindrical body. Each of the members has tapered portions (2 and 2'), with slopes (7) comprising a steep gradient portion (4) and a gentle gradient portion (6), to minimize the area of contact between the cylindrical body and the members to bring the dough to the portion at which the body is to be cut and to minimize the likelihood of the dough adhering to the members.

9 Claims, 7 Drawing Sheets

APPARATUS FOR SHAPING A SPHERICAL BODY

BACKGROUND OF THE INVENTION

1. Field of the Invention

This invention generally relates to shaping a spherical body consisting of a dough crust and a filling, and more particularly, to shaping the spherical body by constricting a continuously fed cylindrical body consisting of a dough crust and a filling, without exposing or spilling the filling.

2. Prior Art

Japanese Utility Model Early-Publication No. 85178/85 discloses a cutter comprising a plurality of squeezing pieces in a guide, means to slide the squeezing pieces, whereby bar foodstuffs are cut. This utility model provides a cutter wherein the bar-shaped foodstuffs, consisting of a single component, are cut by the squeezing pieces. Each of the squeezing pieces is thin and has at its inner end a sharp edge to smoothly cut the foodstuffs.

U.S. Pat. No. 4,251,201 discloses an extrusion apparatus wherein an iris valve closes and opens its polygonal aperture to cut an extruded article consisting of a filling and a coating material. The iris valve is composed of a plurality of circumferential disposed leaf members, which open and close the aperture by force applied in radial directions. The leaf members overlap each other to make the aperture, so that the thickness of each leaf member is necessarily limited, and the aperture cannot be completely closed. Further, as the aperture is necessarily defined by the sharp edges formed at the inner ends of the thin leaf members, the article is liable to be penetrated by the leaf members as it is cut by a sharp blade, whereby the filling is readily exposed. Also, the article tends to clog between the leaf members.

U.S. patent application Ser. No. 900,074 filed on Aug. 9, 1986, now U.S. Pat. No. 4,734,024 discloses an apparatus and method for shaping a spherical body consisting of dough crust and a filling. In this apparatus, a cylindrical body is continuously fed to and through an opening of a shaping assembly comprising at least three slidable members. The members are assembled in a sliding relationship with reference to one another and moved inwardly and outwardly to close and open the opening, whereby the spherical body is shaped. As shown in FIG. 19, two inwardly disposed slidable surfaces (103, 105) of each sliding member (101) form an edge (110) therebetween and adjacent to the edge there is a tapered portion (102) tapering off in the direction of the edge. Due to this structure, the continuously fed cylindrical body can be cut without exposing the filling, with the dough crust being brought to the area where the cylindrical body is cut. In this apparatus, the tapered portions (102) of the members (101) have slopes (107) of a constant negative gradient. Accordingly, if the dough crust consists of a relatively adhesive material, such members provide areas of contact with the cylindrical body relatively wider than necessary, resulting in the likelihood of the dough adhering to the members. Additionally, such a wide area of contact tends to bring an excessive amount of the dough crust to the point where the dough is cut, resulting in a spherical body with a dough crust of an uneven thickness or with part of the dough crust protruding from the remaining body.

Therefore, when a spherical body consisting of the crust and the filling is prepared by cutting a continuously fed material, an apparatus and method has been required in which an opening completely closes, no filling or crust is liable to adhere to the cutter or between members constituting the cutter, and the filling is encrusted with a crust of a uniform thickness.

SUMMARY OF THE INVENTION

An object of the invention is to provide an apparatus in which a filling-containing cylindrical body is cut to shape a spherical product consisting of a covering and a filling.

Another object of the invention is to provide an apparatus in which a continuously fed cylindrical body is cut while the filling is fully encrusted by the covering with a uniform thickness, even when the dough crust is highly sticky or soft, thereby continuously producing shaped spherical bodies.

Still another object of the invention is to provide an apparatus in which a continuously fed cylindrical body is cut in a manner that no filling or crust adheres to the cutter and the operation is suited for mass production.

In accordance with an aspect of the invention, an apparatus for shaping a round body consisting of dough crust and a filling is provided, which comprises:

(a) an assembly comprising at least three circumferentially disposed members assembled in a sliding relationship with reference to one another, (b) an opening confined by said members at the center of said assembly, (c) means for continuously supplying a cylindrical body consisting of a dough crust and a filling to and through said opening, (d) means for moving all said members inwardly and outwardly in a direction perpendicular to the longitudinal axis of said cylindrical body to close and open said opening, each of said members including two sliding surfaces adjoining each other forming an edge therebetween, along which surfaces the adjacent sliding surfaces of the adjacent members are slidable, and a tapered portion formed adjacent said edge, where the top surface contains areas of different gradients arranged in the direction of said edge.

In this invention, force is applied to the cylindrical body from at least three directions by at least three slidable members which form a circular, inwardly directed cutter with an inner opening through which a cylindrical body is adapted to pass. A sliding surface of one member slides on a sliding surface of another member to contact the surface of the cylindrical body passing through the opening and the sliding members gradually constrict the cylindrical body and cut it.

Since the force is applied to the cylindrical body along the loci of the sliding movements of the members, which loci are biased in a direction tangential to the circumference of the cylindrical body, the cylindrical body does not receive centripetally acting force, and the dough crust adjacent the sliding surfaces tends to be made to flow to a portion at which it is to be cut, because of the frictional force between the sliding surfaces and the surface of the dough crust. Also, since the contact area of the sliding surfaces with the cylindrical body decreases while constricting it by applying tangential force to the body, the body does not receive force which would cause the cutter to penetrate the body.

According to this invention, furthermore, the area of the sliding surfaces in contact with the cylindrical body decreases rapidly at first and then gradually by changing the gradient of the slope at their tapered portion. As a result, the contact area is minimized but not to such an extent that would prevent the sliding surfaces from providing enough force to bring the dough to the center of the opening. The parts of the sliding surfaces which come into contact with the cylindrical body brings the dough to the center of the opening where the dough is to be cut. By so doing, the filling is readily separated in the axial direction of the cylindrical body while the dough crust completely envelopes the filling. This is due to the difference between the rheological properties of the dough crust and the filling. At the beginning of the cutting process, the sliding surfaces other than the tapered portions, as well as the tapered portions, are in contact with the cylindrical body, and the contact area is the largest so that enough force is applied to the cylindrical body so as to bring the dough in the direction of movement of the sliding surfaces and thus into the area where the dough is cut and to separate the filling. The area of the sliding surfaces in contact with the body decreases rapidly due to the steep slope of the tapered portion. Since the sliding members become very thin near the edges (10), when the opening is narrowed the cylindrical body is surrounded by the relatively thin portions of the sliding members. By then the opening is filled with the dough crust only. The sliding members then cut into the body by their inward movements to close the opening. In other words, the sliding members start decreasing their thicknesses after enough dough is brought to the area where the body is cut of, to exclude the filling from the area. The sliding members then decrease their thicknesses rapidly so that the total area of the surfaces in contact with the body during the cutting operation is highly reduced and no additional dough can be brought to the area. Therefore, the adhesion of the dough to the member and excessive accumulation of the dough at the area where the cylindrical body is cut are avoided, resulting in providing a spherical body with a dough crust of a uniform thickness.

DESCRIPTION OF THE PREFERRED EMBODIMENTS

A first embodiment of the invention will now be described by reference to the drawings.

Figure 1:
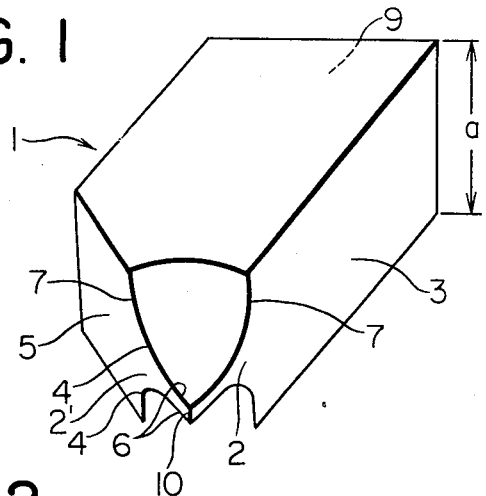
FIG. 1 is a perspective view of one of the sliding members which constitute an assembly of a first embodiment of the invention.
Figure 2:
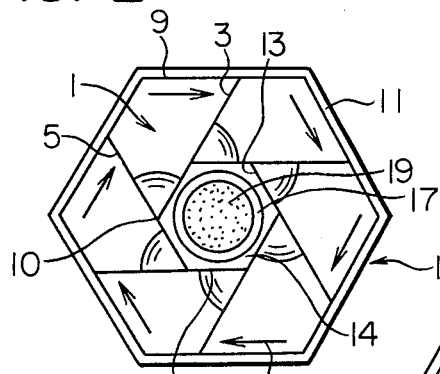
FIGS. 2, 3, and 4 are plan views of an assembly of the first embodiment, which is composed of a housing and a plurality of the sliding members, and their positional relationships before, during and after a cycle of their sliding movements.
Figure 4:
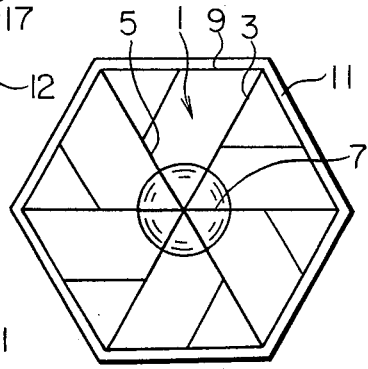
Figure 3:
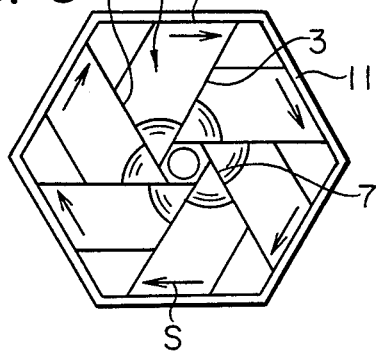
Figure 5:
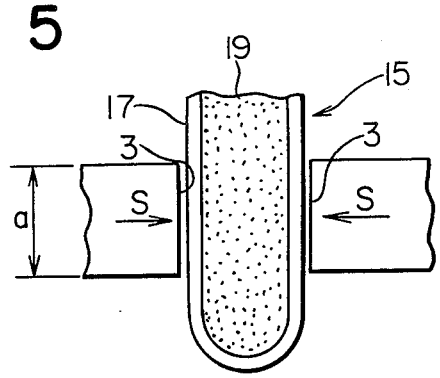
FIGS. 5, 6, and 7 are cross-sectional views, each corresponding to FIGS. 2, 3, and 4, respectively, illustrating the process of constricting a cylindrical body by the surfaces of the sliding members of the first embodiment.
Figure 11:
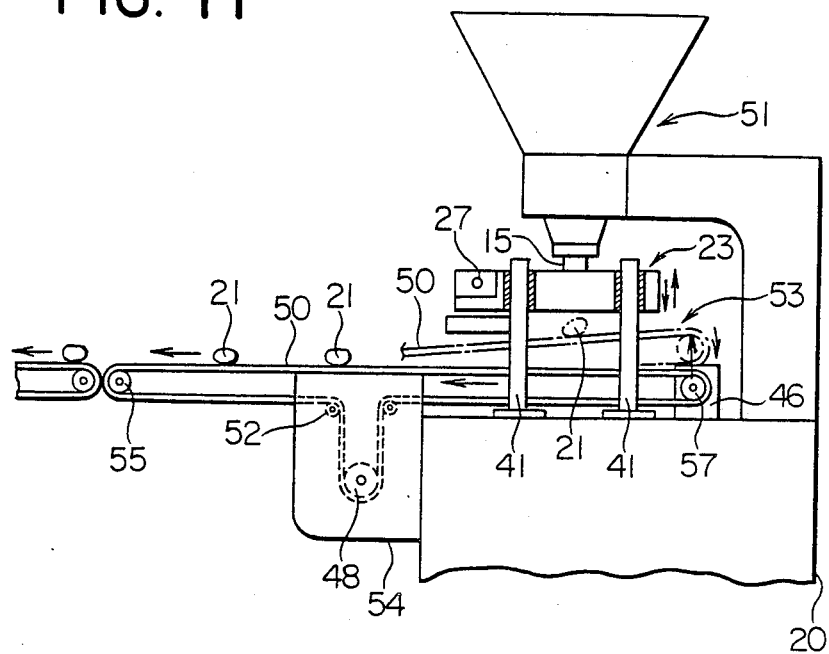
FIG. 11 is a schematic side elevational view of said embodiment.

In FIG. 1, a sliding member (1) of the cutter assembly is shown. The member (1) is a hexahedron with two opposing trapezoidal surfaces, which form the top and bottom surfaces, with four side surfaces with a height of a. Three of the side surfaces constitute a first and second adjoining inner sliding surfaces (3 and 5). The third side surface is an outer sliding surface (9). All of these sliding surfaces are vertical. The two inner sliding surfaces (3 and 5) meet at an edge (10). The area adjacent the edge (10) forms a tapered portion (2) tapering in the direction of the edge (10). The tapered portion is provided by cutting the corners formed by the two adjoining inner sliding surfaces (3 and 5) and the top and bottom surfaces of the member (1). FIG. 1 shows that the top and bottom surfaces are cut to provide two curved slopes (7). In this embodiment, the dough crust to be cut may be a material having a high tackiness, and the tapered portion (2) has slopes (7) of a negative arcuate gradient towards the edge (10). Each slope comprises a steep gradient portion (4) at an area the furthest from the edge (10) and a gentle gradient portion (6) adjacent the edge (10), and thus the area in contact with the cylindrical body decreases rapidly and then gradually. The height a of the member (1) is, for example, 30 mm, and the radius of the arc (7) is 15 mm. The slope on the bottom surface of the tapered portion can be dispensed with, without much disadvantage, depending on the case, especially when means is provided as shown in FIG. 11 to receive a spherical body at an elevated position and then lower the body in synchronization with the descent of the cylindrical body. In such a case, it will be readily understood that the edge (10) will be formed adjacent the bottom surface of the sliding member and the slope (4) of the top surface will be formed so that its lowest point is close to the bottom surface. When a plurality of members (1) are put together to form an assembly (12) in a housing (11), as shown in FIG. 2, where the outer sliding surface, and another surface other than the inner sliding surfaces, are in contact with the inner wall of the housing, an opening (14) is formed surrounded by part of an inner sliding surface (3) of each member. The members (1) are slidingly moved in the directions as indicated by arrows s, by moving a pin (25) (FIG. 9) fixedly mounted on one of the members (1), as explained later in further detail. When the pin (25) moves a member (1), the outer sliding surface (9) of each member slides on the inner wall of the housing (11), forcing the outer sliding surfaces (9) of the other members to move along the inner wall of the housing (11). The inwardly exposed parts of the inner sliding surfaces (3) constitute walls (13), which confine the opening (14). The opening (14) has a cross-sectional area which, when the opening (14) is fully opened, is sufficiently wide to pass the cylindrical body (15), which consists of dough crust (17) and a filling (19). As will be understood by reviewing FIGS. 2, 3, and 4 and FIGS. 5, 6 and 7 in sequence, when the outer sliding surface (9) of each member (1) slides, the second inner sliding surface (5) of a preceding member is made to slide on the first inner sliding surface (3) of trailing member, thereby causing the edge (10) to move in the inward direction. These sliding movements result in reducing the area of the opening (14). When the cylindrical body (15) extends through the opening (14), as shown in FIGS. 2 and 5, and the members (1) are caused to move in the direction S, the inwardly exposed parts of the sliding surfaces (3) apply constricting force to the cylindrical body in a circumferentially biased direction, along the loci of the sliding movements of the members. When the members (1) are moved to the position shown in FIG. 3, the opening (14) is closed to the extent as shown therein and in FIG. 6, causing the cylindrical body (15) to be constricted accordingly. When the members (1) slide, they come in contact with the outer surface of the cylindrical body (15) at the walls (13), i.e. the inwardly exposed parts of the sliding surfaces (3), and the greater the distance of the sliding motion of each member, the more constricted the area of the outer surface of the cylindrical body (15) in contact with the walls (13). Thus, as the area of the opening decreases, the area of the walls (13) in contact with the cylindrical body (15) decreases.

The cutting operation of the members (1) of the assembly will be described in greater detail. The cylindrical body (15) is continuously fed from a feeder (not shown) and is made to pass through the opening (14), at the start of the cutting operation, the cylindrical body is surrounded by parts of the sliding surfaces (3) in such a manner that the area of contact between the cylindrical body and the sliding surfaces is the greatest. Due to the slopes (7) of the tapered portion (2), the height of the walls (3) surrounding the cylindrical body rapidly decreases to a height a' along with the progress of protrusion of the walls (3) in the direction S, and then gradually decreases to a height a''. Therefore, the area of the walls in contact with the cylindrical body decreases rapidly at first and then gradually along with the inward movement of the sliding members. Due to the difference in the rheological properties of the dough crust (17) and the filling (19), the filling (19) is readily forced to move in the axial direction of the cylindrical body as indicated by arrows m, while the dough crust is brought to the center of the opening (14) where the body is to be cut.

Figure 7:
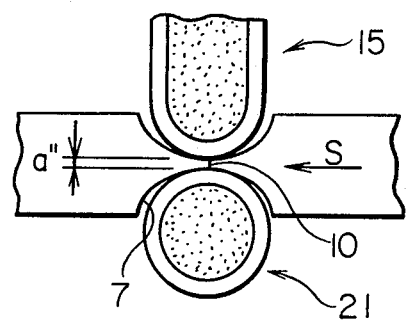
Figure 8:
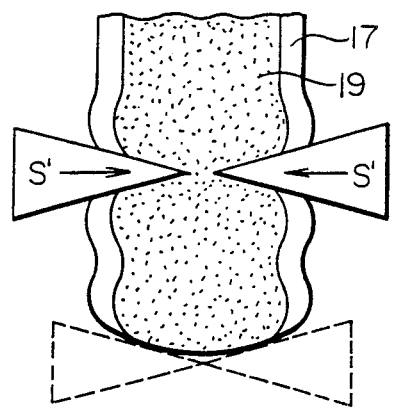
FIG. 8 illustrates a stage in the process of cutting a cylindrical body by wedge-formed blades of prior art.

In a conventional device, as shown in FIG. 8, where wedge-formed blades are used, when the blades move in the inward direction, they intrude into the filling (19) as indicated by arrows S', while increasing the area of the blades in contact with the cylindrical body. In the present invention, during the sliding movements of the members, the cylindrical body receives force from the walls of the sliding surfaces (3) along the loci of the movements of the sliding surfaces (3) in a direction tangential to the surface of the body after the body is cut, the sliding members of the assembly quickly return to their initial position to cut the next spherical body from the cylindrical body. During the process, friction between the dough crust and the walls of the sliding surfaces (3) causes the dough to flow in the direction S, while causing the filling to separate in two opposite directions m. Before the height of the walls decreases to a height a'' as shown in FIG. 7, the opening (14) is filled only with the dough crust, the filling having been dislocated to either side of the opening (14). When the opening (14) is completely closed, the cylindrical body is finally cut as shown in FIG. 7 and a shaped body (21) is produced.

Figure 6:
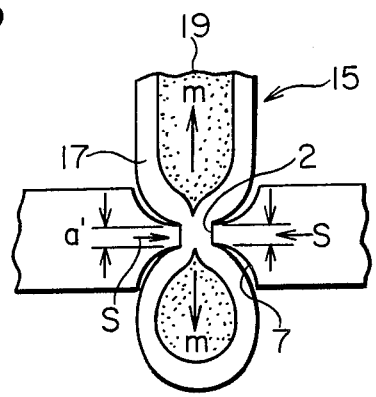

It should be noted that the greater the height of the walls in contact with the dough crust, the more dough crust is brought to the center of the opening (14). In contrast, the smaller the height of the walls, the more dough crust is pushed away from the opening (14) in two opposite directions m. Therefore, it is preferable that at the start of the cutting process the walls are kept relatively high to bring a sufficient amount of dough to the cutting area, and then the height decreases rapidly. Before the walls decrease their height to such an extent that they can readily penetrate the dough crust, the opening is already filled with the dough, as shown in FIG. 6. Once the opening is filled with the dough, the walls can readily cut into the body without exposing the filling. Therefore, the height of the walls decreases gradually a' to a'' as shown in FIG. 7, so that the opening is completely closed and the spherical body (15) is cut from the cylindrical body (21). Therefore, the area of the dough in contact with the members is minimized so that exposure of a filling caused by dough's adhesion to the members is avoided. According to this invention, the area of the walls in contact with the cylindrical body starts decreasing rapidly after enough dough is brought to the cutting area and the filling starts separating. Such excessive dough often forms a protrusion from or a thickened portion on the spherical body at the area where the body is cut. Such a disadvantage is prevented by this invention, and a spherical body consisting of a filling encrusted by a dough crust with a uniform thickness can be produced.

Figure 9:
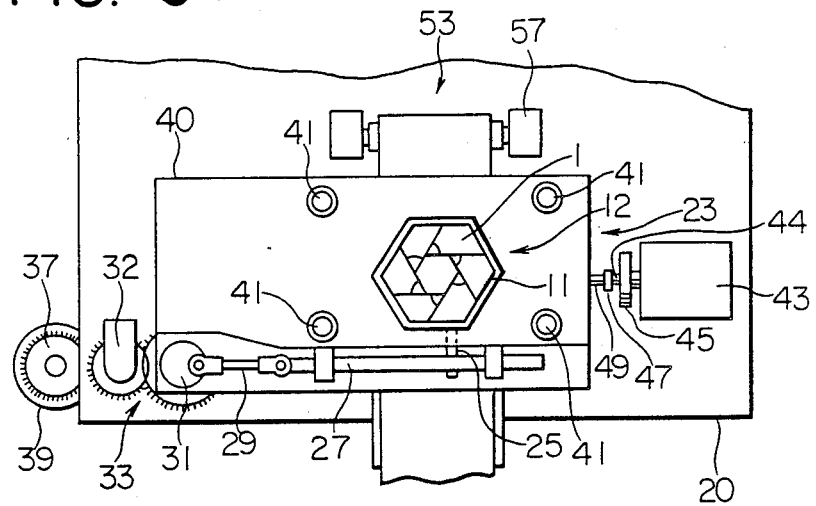
FIG. 9 is a schematic plan view of an embodiment of the apparatus of this invention.
Figure 10:
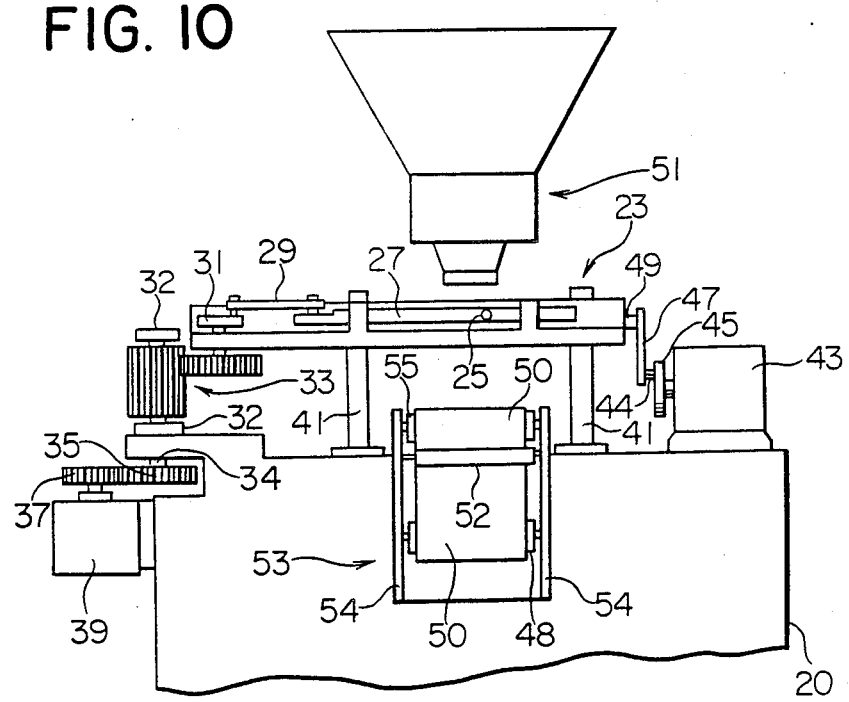
FIG. 10 is a schematic elevational view of the embodiment shown in FIG. 9.

In FIGS. 9, 10, and 11, the apparatus has a base (20), a cutter device (23), a cylindrical body supply device (51), and a belt conveyor (53). The cutter device (23) comprises a frame (40), the housing (11) mounted on the frame (40) and accomodating the members (1), and a slider (27). The frame (40) is adapted to slide upwardly or downwardly as explained later, along supporting shafts (41) which are mounted on the base (20). A pin (25) is connected, through a slot formed on the housing (11), to the outer sliding surface (9) of one of the members (1), and another end of the pin (25) is fixed to the slider (27). An end of the slider (27) is connected to an end of a crank rod (29). The other end of the crank rod (29) is rotatably connected by means of a pin to a point near the circumference of a disc (31). The disc (31) is concentrically and fixedly connected to a gear which is adapted to rotate by a slide gear (33) supported by a bracket (32) mounted on the base (20). The slide gear (33) can be rotated by a motor (39) through its own shaft (34) and gears (35) and (37). When the motor (39) starts, the slider (27) repeatedly moves back and forth and slides the members (1) in the housing (11).

One end of a pin (49) is fixedly connected to an end of the cutter device (23), and the other end of the pin (49) is rotatably connected to an end of a crank rod (47). The other end of the crank rod (47) is rotatably connected to an end of a pin (44). The other end of the pin (44) is fixedly connected to a disc (45) at a poing near the circumference thereof. The disc (45) is connected to and rotated by a motor (43) to cause the crank rod (47) to move downwardly and upwardly, whereby the cutter device (23) can be repeatedly lowered and lifted, in synchronization with the cutting operation. This vertical reciprocal movement is designed to enable the cutter device (23) to cut the continuously descending cylindrical body efficiently at a predetermined position.

The belt conveyor (53) is composed of a conveyor frame (54), rollers (48), (55), and (57), two tension rollers (52), a belt (50), and a motor (not shown) for driving the belt conveyor (53).

The cylindrical body (15) is continuously fed from the supply device (51) and is constricted by the cutter device (23) in a direction perpendicular to the axis of the cylindrical body to shape a spherical body (21), which is fed onto the next station by the belt conveyor (53).

In FIG. 11, it will be understood that one end of thebelt conveyor (53) is made to move upwardly and downwardly by a conveyor lifting device (46) mounted on the base (20), in synchronization with the movements of the assembly of the cutter device (23), so that the roller (57) is swung about the roller (55), to avoid deformation of the spherical body (21) by receiving it at the instant that it is separated from the cutter device (23).

Figure 12:
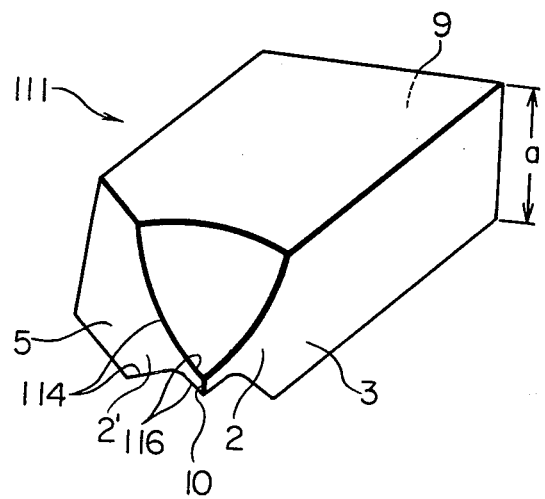
FIG. 12 is a perspective view of a sliding member which constitutes with other similar members an assembly of a third embodiment.

FIG. 12 shows one of the members (111) constituting the assembly of a second embodiment. It should be noted that the member (111) is the same as the member (1) in FIG. 1 except for the slopes of the tapered portion. In this embodiment, the tapered portion (2) includes slopes of steep linear negative gradients (114) and horizontal linear ends (116) so that the area of contact with the cylindrical body decreases rapidly at first and then gradually in the direction of the edge (10) to minimize the total contact area. To obtain such a result, the horizontal ends (116) of the tapered portion (2) can be replaced by slopes of gentle linear negative gradients.

Figure 13:
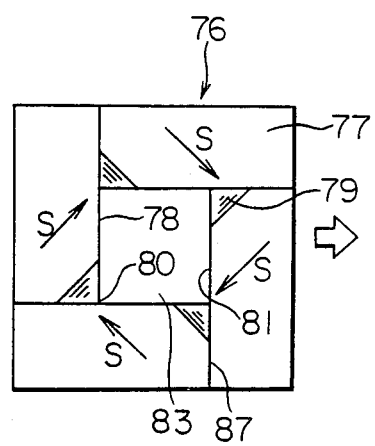
FIGS. 13 and 14 illustrate the movements of an assembly composed of four sliding members, each a rectangular parallelepiped having a tapered portion.
Figure 14:
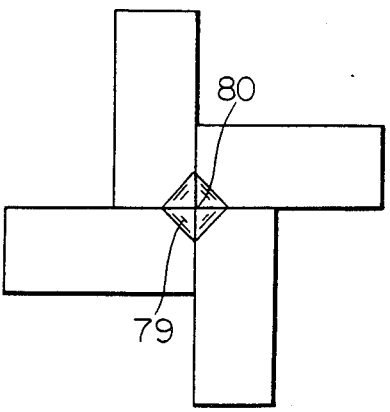

In this invention, various other sliding members can be used as shown in FIGS. 13, 14, 15, and 16. In FIG. 13 an assembly (76) is composed of four rectangular parallelepiped members (77), each having at a corner a tapered portion (79) with a slope linear in vertical cross-section, sliding surfaces (78) and (87), and an edge (80). Part of a sliding surface (78) of each member forms walls (81) defining an opening (83), and each member slides in a direction S. When the opening (83) is closed, the position of the members is as shown in FIG. 14.

Figure 15:
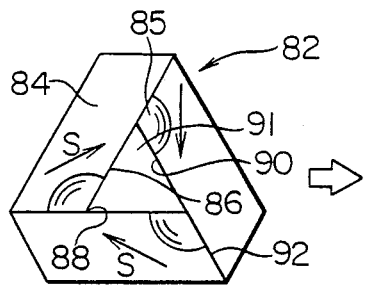
FIGS. 15 and 16 illustrate the movements of an assembly composed of three sliding members, each a parallelepiped having a tapered portion.
Figure 16:
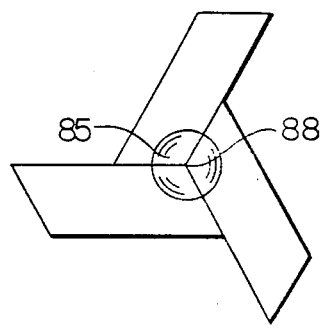

An assembly can be composed of three parallelepiped members, as shown in FIG. 15, each having a tapered portion (85) with a slope curved in vertical cross-section, sliding surfaces (86) and (92), and an edge (88). Walls (90), formed by a sliding surface (86) of each member define an opening (91), and each member slides in a direction S. When the opening (91) is closed, the position of the members is as shown in FIG. 16.

Figure 17:
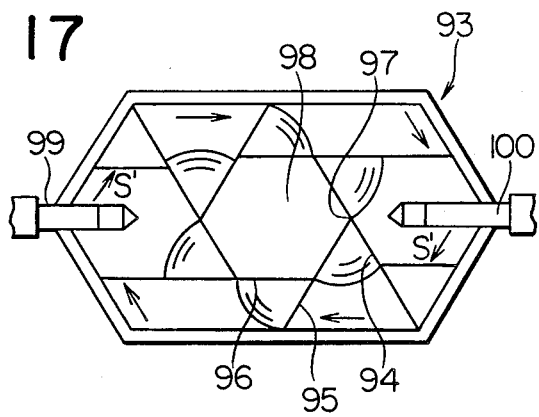
FIGS. 17 and 18 illustrate the movements of an assembly composed of three pairs of sliding members, each having a tapered portion, where each pair is differently formed from the other pairs.
Figure 18:
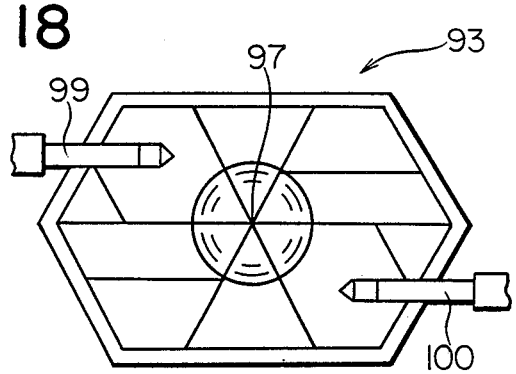
Figure 19:
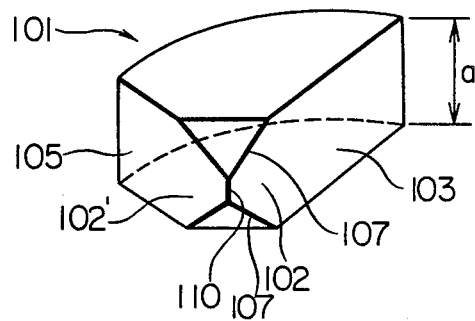
FIG. 19 is a perspective view of a sliding member of a prior art assembly.

Moreover, such an assembly may not always be composed of identical polyhedrons. As shown in FIGS. 17 and 18, an assembly (93) is composed of three pairs of polyhedral members having different forms. Each of the members has curved slopes (94), sliding surfaces (95 and 96), and an edge (97), like the other embodiments. Thus each member slides in the direction S' to close the opening (98). The position of the members when the opening (98) is closed is as shown in FIG. 18. In this embodiment, to smooth the sliding operation, two pins (99 and 100) fixed to sliders are provided and connected to a pair of the members at one end. However, such operation can also be performed by one pin connected to one of such members.

In this invention, the constriction of the cylindrical body is carried out while the area of the walls of the opening in contact with the surface of the cylindrical body decreases rapidly at first and then gradually, during the inward movement of the members. Since the total area of the sliding surface in contact with the cylindrical body is decreased, the likelihood of the dough adhering to the members is minimized. Moreover, since the contact area decreases slowly after a sufficient amount of dough has been brought to the area where the cylindrical body is cut, no excessive dough can be brought there. Therefore, a spherical body with a dough crust of a uniform thickness is shaped by the apparatus of this invention even though the dough crust material has a high tackiness.

While the shaping apparatus of the present invention has been described with reference to several preferred embodiments, it is to be understood that various changes and modifications may be made within the scope and spirit of the invention.

I claim:

1. An apparatus for shaping a spherical body consisting of an outer crust and an inner filling from a cylindrical body of said outer crust and inner filling which is continuously fed in a downward vertical direction along a feeding axis, comprising:
    (a) a shaping assembly including at least three shaping members disposed circumferentially around said feeding axis and horizontally parallel with each other and defining an aperture therethrough centered on said feeding axis, said members being assembled in horizontal sliding relationship to one another so as to open and close said aperture;
    (b) means for continuously feeding said cylindrical body to and through said aperture along said feeding axis; and
    (c) means for moving all of said members slidingly together outwardly and inwardly to open and close said aperture,
    wherein each of said members is formed with a first vertically oriented side surface, and a second vertically oriented side surface, said first and second side surfaces being at an angle with respect to one another and meeting at a tapered end portion thereof having a top surface tapering to a vertical edge parallel to the feeding axis, wherein the first side surface of each of said members slides horizontally on the second side surface of an adjacent member so as to bring said members together inwardly to close said aperture, and wherein said top surface of said tapered end portion of each member is a curved surface having areas of different curve gradients arranged in the vertical direction, whereby the tapered end portions of said members are closed on said cylindrical body while reducing in vertical height along said feeding axis as said members are moved inwardly in order to push the outer crust by said tapered end portions over the inner filling to completely and evenly close each spherical body.

2. An apparatus of claim 1, in which the top surface of said tapered portion tapers off steeply at first, then gently in the direction of said edge.

3. An aparatus of claim 2, in which the top surface of said tapered portion comprises a slope of a negative curve gradient.

4. An apparatus of claim 2, in which the top surface of said tapered portion comprises a slope of negative linear gradients including a steep gradient portion positioned away from said edge and a gentle gradient portion adjacent said edge.

5. An apparatus of claim 2, in which the bottom surface of said tapered portion contains areas of different gradients arranged in the direction of said edge.

6. An apparatus of claim 1, in which the top surface of said tapered portion comprises a slope of a negative curve gradient.

7. An apparatus of claim 1, in which the top surface of said tapered portion comprises a slope of negative linear gradients including a steep gradient portion positioned away from said edge and a gentle gradient portion adjacent said edge.

8. An apparatus of claim 7, in which the slope of a negative linear gradient comprises a steep gradient portion positioned away from said edge and a horizontal end adjacent said edge.

9. An apparatus of claim 1, in which a corresponding bottom surface of said tapered portion contains areas of different gradients arranged in the direction of said edge.

* * * * *